United States Patent
Bennington et al.

(10) Patent No.: US 11,861,957 B2
(45) Date of Patent: Jan. 2, 2024

(54) TIME MASTER AND SENSOR DATA COLLECTION FOR ROBOTIC SYSTEM

(71) Applicant: Argo AI, LLC, Pittsburgh, PA (US)

(72) Inventors: Dane P. Bennington, Pittsburgh, PA (US); Stephen Ressler, San Francisco, CA (US); Elizabeth Ballard, Pittsburgh, PA (US); Michel Laverne, Pittsburgh, PA (US)

(73) Assignee: Argo AI, LLC, Pittsburgh, PA (US)

( * ) Notice: Subject to any disclaimer, the term of this patent is extended or adjusted under 35 U.S.C. 154(b) by 1072 days.

(21) Appl. No.: 16/407,773

(22) Filed: May 9, 2019

(65) Prior Publication Data

US 2020/0357205 A1 Nov. 12, 2020

(51) Int. Cl.
*G07C 5/10* (2006.01)
*G06F 16/27* (2019.01)
*G04F 10/00* (2006.01)
*G01S 7/00* (2006.01)

(52) U.S. Cl.
CPC ............... *G07C 5/10* (2013.01); *G01S 7/003* (2013.01); *G04F 10/00* (2013.01); *G06F 16/27* (2019.01)

(58) Field of Classification Search
CPC .... G06F 16/27; G06F 16/2365; G01S 76/003; G04F 10/00; G07C 5/10
USPC ...................................................... 701/32.4
See application file for complete search history.

(56) References Cited

U.S. PATENT DOCUMENTS

| | | |
|---|---|---|
| 5,777,580 A | 7/1998 | Janky et al. |
| 6,127,970 A | 10/2000 | Lin |
| 6,205,400 B1 | 3/2001 | Lin |
| 6,364,807 B1 | 4/2002 | Koneda et al. |
| 6,427,122 B1 | 7/2002 | Lin |
| 6,480,789 B2 | 11/2002 | Lin |
| 6,570,609 B1 | 5/2003 | Heien |
| 6,647,328 B2 | 11/2003 | Walker |
| 6,735,523 B1 | 5/2004 | Lin et al. |
| 6,875,154 B2 | 4/2005 | Mitsutani et al. |
| 7,213,985 B1 | 5/2007 | Chen |

(Continued)

FOREIGN PATENT DOCUMENTS

| | | |
|---|---|---|
| CN | 105548197 B | 8/2018 |
| EP | 3152956 B1 | 3/2019 |
| WO | 2019039279 A1 | 2/2019 |

OTHER PUBLICATIONS

Extended European Search Report for European Patent Application No. 20801752.5 dated Dec. 9, 2022, 9 pages.

*Primary Examiner* — Hunter B Lonsberry
*Assistant Examiner* — Robert Louis Pinkerton
(74) *Attorney, Agent, or Firm* — Fox Rothschild LLP

(57) ABSTRACT

A time master and sensor data collection module for a robotic system such as an autonomous vehicle is disclosed. The module includes a processing device, one or more sensors, and programming instructions that are configured to cause the processing device to operate as a timer that generates a vehicle time, receive data from the one or more sensors contained within the housing, and synchronize the data from the one or more sensors contained within the housing with the vehicle time. The integrated sensors may include sensors such as a global positioning system (GPS) unit and/or an inertial measurement unit (IMU). The module may interface with external sensors such as a LiDAR system and/or cameras.

20 Claims, 5 Drawing Sheets

(56) References Cited

U.S. PATENT DOCUMENTS

| | | | |
|---|---|---|---|
| 7,567,166 B2 | 7/2009 | Bourgine De Meder | |
| 7,893,958 B1 | 2/2011 | D'Agostino | |
| 8,018,376 B2 | 9/2011 | McClure et al. | |
| 8,618,954 B2 | 12/2013 | Free | |
| 8,730,066 B2 | 5/2014 | Malarky | |
| 8,743,201 B2 | 6/2014 | Huang et al. | |
| 9,375,847 B2* | 6/2016 | Angle | H04L 12/282 |
| 9,555,883 B1* | 1/2017 | Navot | B64C 39/02 |
| 9,809,194 B2 | 11/2017 | Laoufi et al. | |
| 9,898,821 B2 | 2/2018 | Metzler et al. | |
| 9,935,685 B2* | 4/2018 | Lane | H04J 3/0655 |
| 9,963,145 B2 | 5/2018 | Penilla et al. | |
| 10,066,745 B2 | 9/2018 | Geiger et al. | |
| 10,435,154 B1* | 10/2019 | Buyse | G07C 5/008 |
| 10,551,501 B1* | 2/2020 | LaChapelle | G01S 7/4818 |
| 10,771,669 B1* | 9/2020 | Balasubramanian | G01S 17/87 |
| 10,854,096 B1* | 12/2020 | Harris | G08G 5/065 |
| 2003/0084337 A1* | 5/2003 | Simionescu | H04L 41/0803 |
| | | | 713/190 |
| 2004/0162635 A1* | 8/2004 | Murakami | B23K 37/006 |
| | | | 700/245 |
| 2006/0220815 A1* | 10/2006 | Thomas | B60C 23/0416 |
| | | | 340/447 |
| 2008/0183305 A1* | 7/2008 | Foster | G06F 21/85 |
| | | | 700/3 |
| 2012/0046820 A1 | 2/2012 | Allard et al. | |
| 2015/0379766 A1 | 12/2015 | Newman et al. | |
| 2017/0124781 A1 | 5/2017 | Douillard et al. | |
| 2017/0139411 A1 | 5/2017 | Hartung et al. | |
| 2017/0155225 A1* | 6/2017 | Villeneuve | H01S 3/06758 |
| 2018/0047295 A1 | 2/2018 | Ricci | |
| 2018/0088584 A1* | 3/2018 | Tascione | G05D 1/0276 |
| 2018/0136311 A1* | 5/2018 | Paradie | G01S 7/0235 |
| 2019/0120948 A1* | 4/2019 | Yang | G01S 17/931 |
| 2019/0250610 A1* | 8/2019 | Luo | G05D 1/0088 |
| 2020/0116502 A1* | 4/2020 | Xu | G01C 21/26 |
| 2020/0357205 A1* | 11/2020 | Bennington | G04G 7/02 |
| 2021/0003693 A1* | 1/2021 | Jales | G01S 7/2927 |
| 2021/0096224 A1* | 4/2021 | Lee | G01S 17/42 |
| 2021/0286079 A1* | 9/2021 | Liu | G05D 1/0088 |
| 2021/0354719 A1* | 11/2021 | Wang | B60W 60/001 |
| 2021/0383133 A1* | 12/2021 | Wang | G01S 13/867 |
| 2022/0221557 A1* | 7/2022 | Yeh | H01S 5/06203 |

* cited by examiner

TIME MASTER AND SENSOR DATA COLLECTION FOR ROBOTIC SYSTEM

BACKGROUND

Robotic systems such as autonomous vehicles rely on multiple types of inputs from different sensing modalities. For example, various systems of an autonomous vehicle typically include an internal measurement unit (IMU), which includes accelerometers, gyroscopes and (optionally) magnetometers. The IMU generates a true representation of vehicle motion in all three axes. Other sensors may include global positioning system (GPS) sensors, cameras, LiDAR and/or SONAR systems, and other sensors.

Robust, high-accuracy timestamping and synchronization of sensor data is critical to building a high-quality system. If the time used by one subsystem of the robotic device is not synchronized with other subsystems of the robotic device, operation of the robotic may be hindered. In addition, inaccurate correlation of system parameters with sensor data can lead to misdiagnosis of system problems.

In the field of autonomous vehicles, sensor modules are available that combine GPS and IMU sensors. However, such modules consume high levels of power and do not synchronize with other components of the vehicle.

The technology described in this document addresses at least some of the issues described above.

SUMMARY

In various embodiments, a time master and sensor data collection system for a robotic device includes a housing that contains a processing device and one or more sensors that are communicatively connected to the processing device. The system includes programming instructions that are configured to cause the processing device to operate as a timer that generates a vehicle time, receive data from the one or more sensors contained within the housing, and synchronize the data from the one or more sensors contained within the housing with the vehicle time. The housing may include one or more guiding structures that are positioned and configured to connect to one or more components of the robotic device.

In some embodiments, the one or more sensors may include an inertial measurement unit (IMU), and the programming instructions that are configured to cause the processing device to synchronize the data from the one or more sensors contained within the housing with the vehicle time include instructions to associate timestamps for the vehicle time with data generated by the IMU.

In some embodiments, the one or more sensors may include a global positioning system (GPS) sensor, and the programming instructions that are configured to cause the processing device to synchronize the data from the one or more sensors may include instructions to associate timestamps for the vehicle time to data generated by the GPS sensor. The programming instructions to synchronize the data from the one or more sensors may include instructions to pass vehicle time data to the GPS sensor.

The system may include additional programming instructions to cause the processing device to generate trigger signals for a camera according to the vehicle time, and also to cause a transmitter or communications port to send the trigger signals to the camera.

The system may include additional programming instructions to cause the processing device to synchronize data from an external LIDAR sensor to the vehicle time. In addition, the system may include additional programming instructions to cause a transmitter or communications port to send vehicle time data to an external LiDAR sensor. Further, the system may include a power supply that is electronically connected to provide power to the LiDAR sensor via a power output port. The system also may include a power conditioner electrically positioned between the power supply and the power output port to provide protection against surges and spikes in power transferred to the LiDAR sensor.

In some embodiments, the system also may include an oscillator that is contained within the housing, configured to generate a time-varying periodic electrical signal, and communicatively connected to the processing device to pass the time-varying periodic electrical signal to the processing device. If so, the programming instructions to generate the vehicle time may include instructions to use the time-varying periodic electrical signal to generate the vehicle time. In addition, the programming instructions to generate the vehicle time may include instructions to identify an epoch event, determine a start time upon occurrence of the epoch event, receive the time-varying periodic electrical signal from the oscillator, and use the periodic electrical signal to drive the timer.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

Other terminology that is relevant to this disclosure is defined at the end of this Detailed Description.

This document describes a novel hardware device that serves as a vehicle time master and sensor data collection system. The device incorporates various sensors of an autonomous vehicle or other mobile robotic device, and which is capable of facilitating high accuracy timestamping and synchronization of sensor data. The synchronization can occur between sensors contained within the module, as well as with other sensors of the robotic device.

Figure 1:
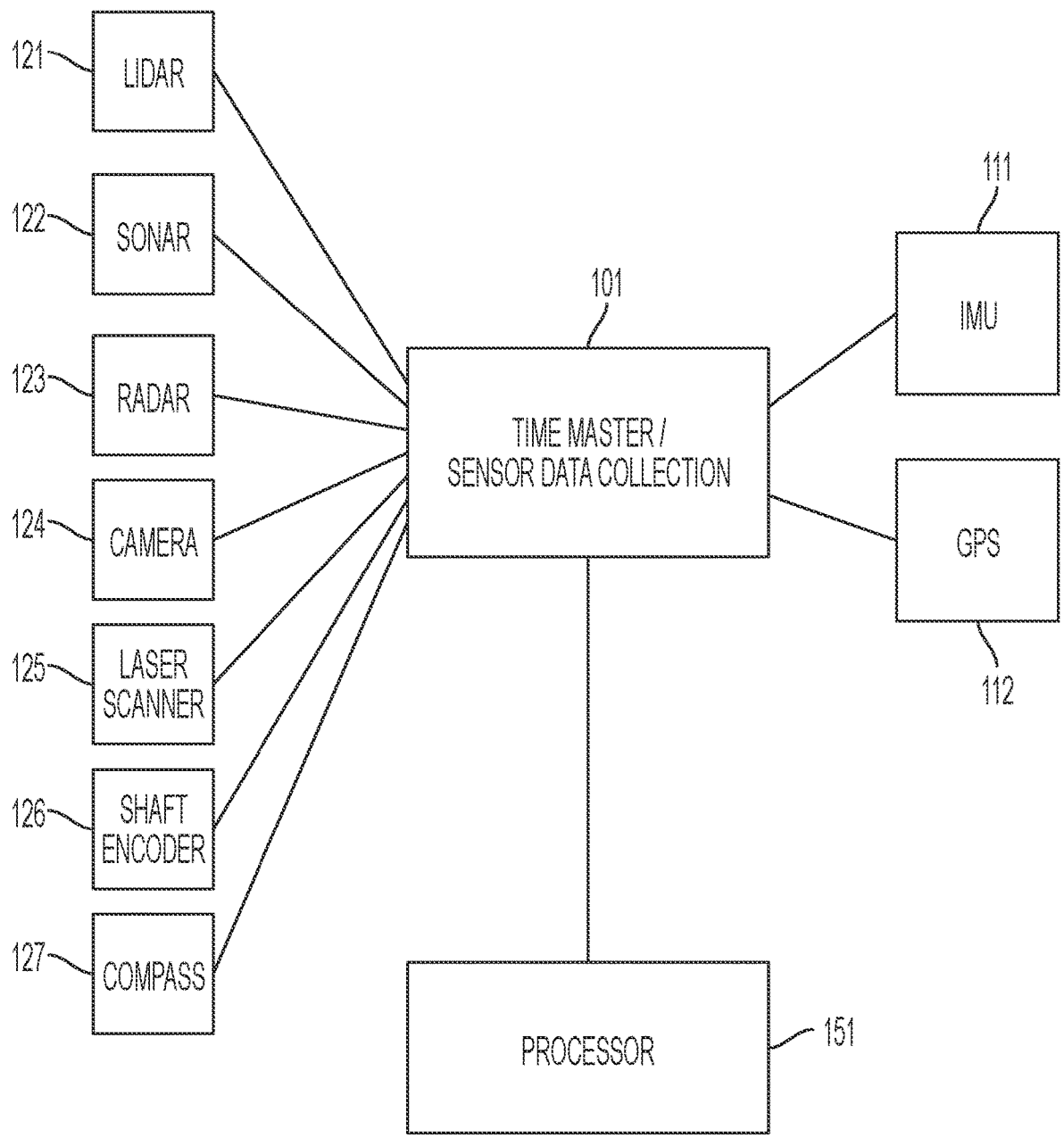
FIG. 1 is a block diagram illustrating example sensors and other components of a robotic system, and in particular an autonomous vehicle.

FIG. 1 is a block diagram illustrating example sensors and other components of a robotic system 100, and in particular an autonomous vehicle. The system 100 includes a time master and sensor data collection module 101, which will be described in more detail in the context of FIG. 2 below. The module 101 is communicatively connected to and/or incorporates various sensors, including an IMU 111 and/or one or more positional sensors that may be components of an IMU such as a gyroscope or accelerometer. The module 101 also will incorporate or be communicatively connected to a processor 101 and a GPS unit 112. The module 101 also may be connected to and/or incorporate other sensors such as a light detection and ranging (LiDAR) system 121; a sonar (i.e., sound navigation and ranging) system 122; a radar system 123; one or more camera systems 124 such as digital cameras, stereo cameras, and/or three-dimensional (3D) cameras; a laser scanner 125; one or more encoders 126 such as may be attached to a wheel or engine of the vehicle (or related components) to measure a number of rotations of the wheel or engine; a compass 127; and/or other sensors.

Figure 2:
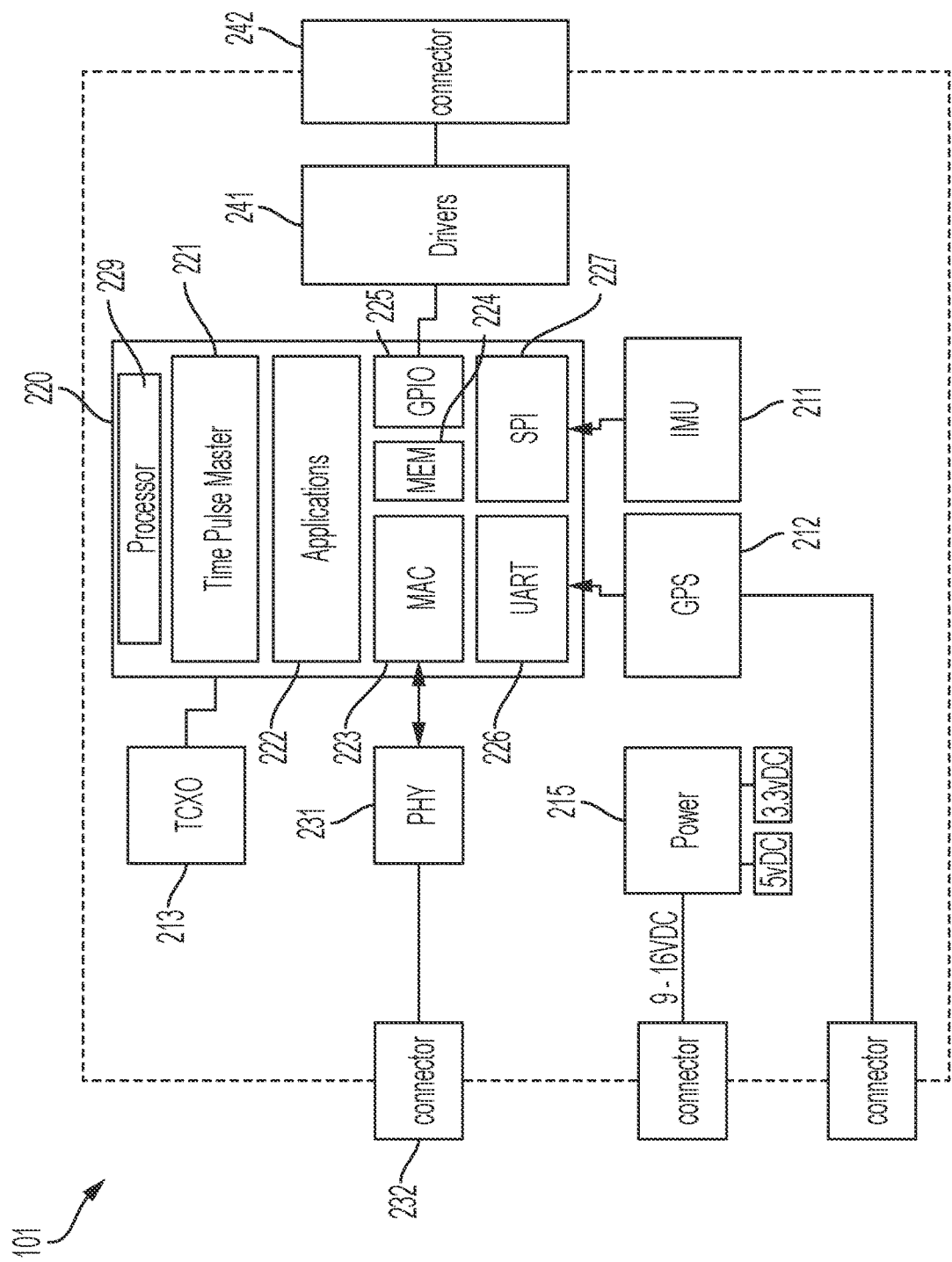
FIG. 2 is a block diagram illustrating example components of a robotic device time master and sensor data collection module.

FIG. 2 illustrates example elements of a time master and sensor data collection hardware module 101. The module 101 integrates IMU 211 and GPS unit 212 sensors in a single module, optionally (but not necessarily) within a common housing, and it provides timestamping and synchronization of data generated by those sensors, as well as other sensors such as a LiDAR system and/or other sensors of the type described above in FIG. 1.

As shown in FIG. 2, the module includes a microcontroller (MCU) 220 that provides various functions. The functions may include a master clock 221 that generates time pulses and serves as a master clock for the module, as well as for the robotic device in general (e.g., it a vehicle-specific clock). The master clock 221 thus may generate a vehicle time, as discussed below.

The module includes or is communicatively connected to a temperature compensated crystal oscillator (TXCO) 213. The TCXO 213 generates a periodic electrical signal and passes it to the master clock of the microcontroller 220. The microcontroller 220 generates a running count that increments as the TCXO 213 oscillates, periodically rolling over (i.e., resetting) to zero when the vehicle timer reaches a threshold value or when an epoch event occurs. Thus, the system may measure time in "vehicle time," which is time from an epoch event (such as the time that the vehicle is turned on), with a reset to zero each time that the epoch event occurs (or another event occurs, such as the vehicle or other robotic device being turned off). Vehicle time is independent of GPS time or other external time systems. In addition, the system may measure time by determining a vehicle time as the Global Time that the vehicle is turned on, and then use the vehicle time to measure an offset from the turn-on time. (Note: this description and the claims will use the term "vehicle time" to refer to the time generated by the time master and sensor data collection hardware module, but the concept of vehicle time is intended to apply not only to vehicles but also to other types of robotic systems, such as drones, robotic medical devices, robotic loading/unloading systems and the like).

The microcontroller 220 may include a multicore architecture, such as that available in the AURIX™ microcontroller that is available from Infineon Technologies AG. The microcontroller will include a processor 229 and memory 224 containing programming instructions that are configured to instruct the processor to perform various functions, such as some or all of the functions described in this document. The GPS unit 212 may communicatively interface and share data with the microcontroller 220 via a universal asynchronous receiver/transmitter (UART) 226 or other communication interface. The IMU 211 may communicatively interface and share data with the microcontroller 220 via a serial peripheral interface (SPI) 227 or other communication interface.

The module may communicatively interface with external processors or other robotic device subsystems via other communication interfaces. For example, the microcontroller 220 may include an Ethernet media access controller (MAC) 223 that communicates with external systems via a physical interface transceiver (PHY) 231 and one or more connectors 232 such as an M12 D coded automation connector to facilitate communication with other devices.

In operation, the module may use its vehicle time to generate timestamps and associate those timestamps with data received from or generated by certain of the vehicle's sensors. For example, the system may do this with data generated by the IMU 211. When messages are exchanged between the microcontroller 220 and certain other components of the system, the messages are time-stamped at time of transmission and reception, and then sent back to their source. After a couple of these handshakes, each endpoint can estimate the round trip delay time by determining the time required from transmission to timestamped reception. The endpoints can also exchange metrics about local clock behavior, network impairments and in some cases, frequency parameters. Thus, the microcontroller 220 can detect whether such components are out of sync with vehicle time, and it can also associate vehicle time timestamps with the other components' data.

For other vehicle sensors (such as LiDAR sensors or imaging systems) that are not part of the vehicle time master and sensor data collection hardware module 101, the microcontroller 220 may provide a time pulse to the external sensor so that the sensor can synchronize its time to vehicle time. For example, a LiDAR system may expect to receive a pulse at the top of each second and also a message (such as a message that follows a National Marine Electronics Association, or NMEA, message structure) that gives information about which second that pulse was meant to denote. Using this information, the LiDAR system can make its timestamp sub-seconds align with the rising edge of that pulse from the microcontroller 220 and timestamp it in seconds that correspond to the time that was in the NMEA (or other) received message.

The GPS unit 212 includes or is connected to a connector device that is configured to receive a GPS antenna that will extend from the outside of the module. A typical GPS unit 212 will timestamp its data according to GPS time, but the module of the present invention may allow the GPS unit 212 to add a "vehicle time" element to its timestamp so that GPS data may be synchronized with, or time-adjusted to, other vehicle sensor data.

As noted above, the module may include a PHY 231 embodied in a chip or other device that is configured to connect the microcontroller to an external device using an Ethernet (or other) communication protocol, such as one or more external camera systems and/or LiDAR systems. The microcontroller 220 can thus exchange timestamp packets with those devices via this connection.

The module also contains one or more drivers 241 for translating output signals from one or more general purpose input/outputs (GPIOs) 225 to a format that is required by one or more external devices, such as cameras, that are communicatively connected to the module via one or more communication connectors 242. One or more cameras may be triggered synchronously from each GPIO 225. In this way, the microcontroller 220 can cause the robotic device's camera system to capture (or stop capturing) video, and the trigger signals will be synchronized with the vehicle time as generated by the microcontroller 220.

Figure 3:
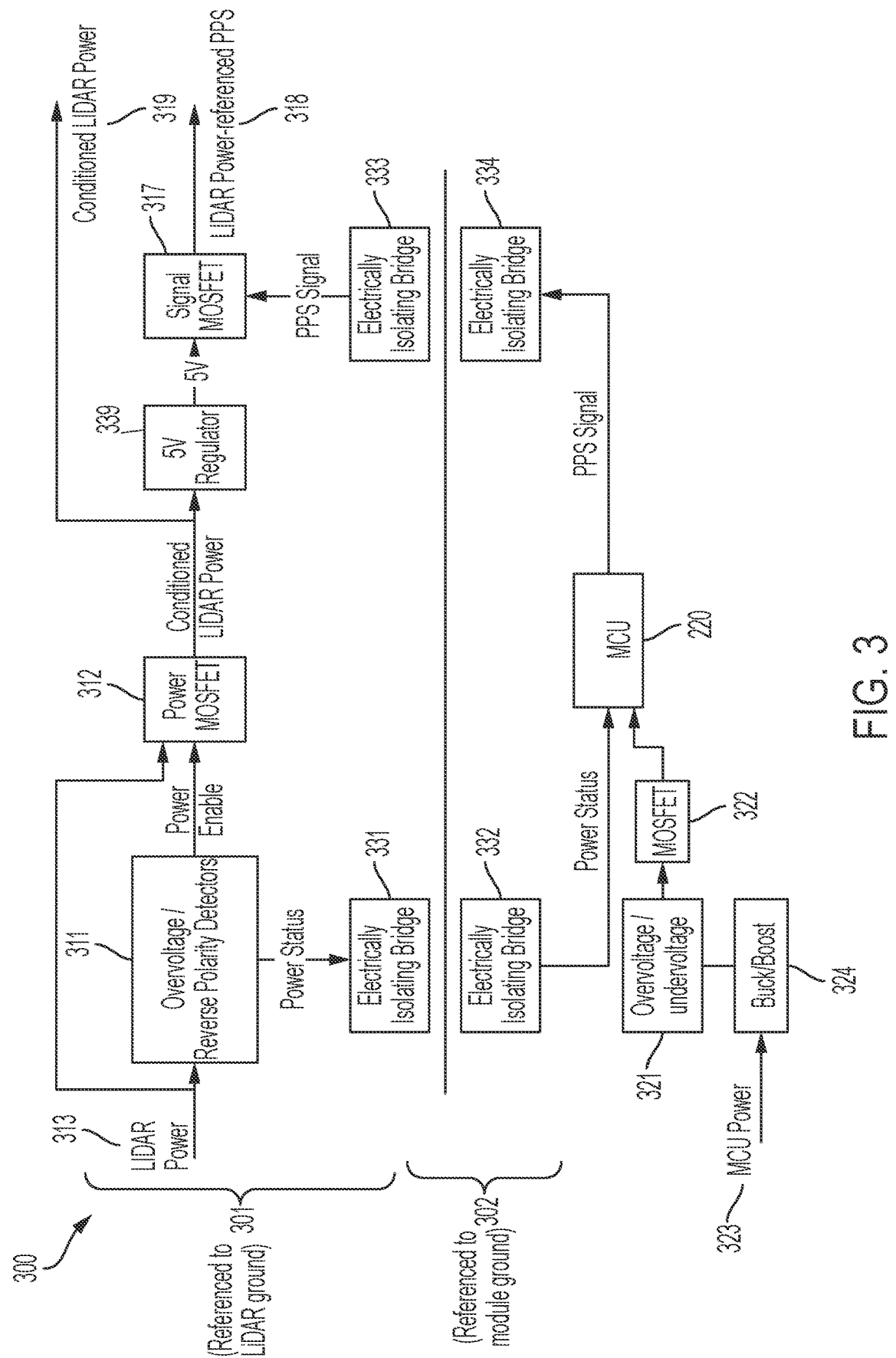
FIG. 3 illustrates example components of a power conditioning circuit that may be used with the module of FIG. 2.

In addition, the module contains a power supply 215 for the module. The power supply 215 also may include a dual-system power conditioning circuit 300 that controls delivery of the power from the power supply to both the vehicle's LiDAR system (which can be very sensitive to variations in voltage or reversed polarity) and to the microcontroller of the time master and sensor data collection module. Referring to FIG. 3, the dual-system power conditioning circuit 300 may include a LiDAR power sub-circuit 301 and an MCU power sub-circuit 302.

The LiDAR power sub-circuit 301 will include an input 313 to receive power from a power source for the LiDAR system and deliver conditioned power to the LiDAR system via output 319. At or near the LiDAR power source input 313, an undervoltage/overvoltage sensor 311 that is capable of detecting (based on feedback from the LiDAR power rail) whether issues exist with the power input that is to be delivered to the LiDAR system will be present, and in particular whether the voltage is over or under threshold levels. One or more transistors or other switches such as MOSFET 312 or MOSFET 317 may shut off delivery of power to the LiDAR system via output 319 to protect the LiDAR system if the overvoltage/undervoltage sensor 311 detects that an issue exists.

The dual-system power conditioning circuit 300 also will include an MCU power subcircuit 302 that includes a power supply input 323 that may be electrically connected to an external power supply and direct the power to the MCU (which may or may not be connected to the same circuit board as the subcircuits). The direction of power may be via a DC/DC buck/boost converter 324 (to convert, for example, 5V to 3.3V) and an overvoltage/lockout sensor 321 and switch (such as MOSFET 322) that (as with the LiDAR subcircuit) allow for wide input voltage operation and safety cutouts in case of inputs outside of allowable upper and lower thresholds.

The input connectors of the dual-system power conditioning circuit (positioned on or external to the module's housing) for receiving power from one or more external sources on the robotic device, such as a battery.

The dual-system power conditioning circuit 300 may allow for the passing of signals between the LiDAR power sub-circuit 301 and the MCU power subcircuit 302 via electrically isolating bridges 331/332 and 333/334. For example, voltage sensor 311 or another component of the LiDAR power sub-circuit 301 may pass a power status signal to the MCU 220 via a regulator 339 and electrically isolating bridge 331/332. The MCU 220 may pass a clock/pulse per second (PPS) or other signal 318 to the LiDAR system via electrically isolating bridges 333/334.

By synchronizing the IMU data and camera triggering signals, by sending time sync packets to the LiDAR system, and by applying synchronized timestamps to GPS data, the module can enable other components of the vehicle to generate accurate determinations that correlate the vehicle to its position and orientation in the environment. For example, the vehicle may then use LiDAR data and/or video data captured by the cameras, and it may use the GPS data to georeference the captured LiDAR or video data to a position in the environment. The georeferencing process is not new, but the PITT module's time-synchronization and/or time-stamping of the data can make the process more accurate.

Figure 4:
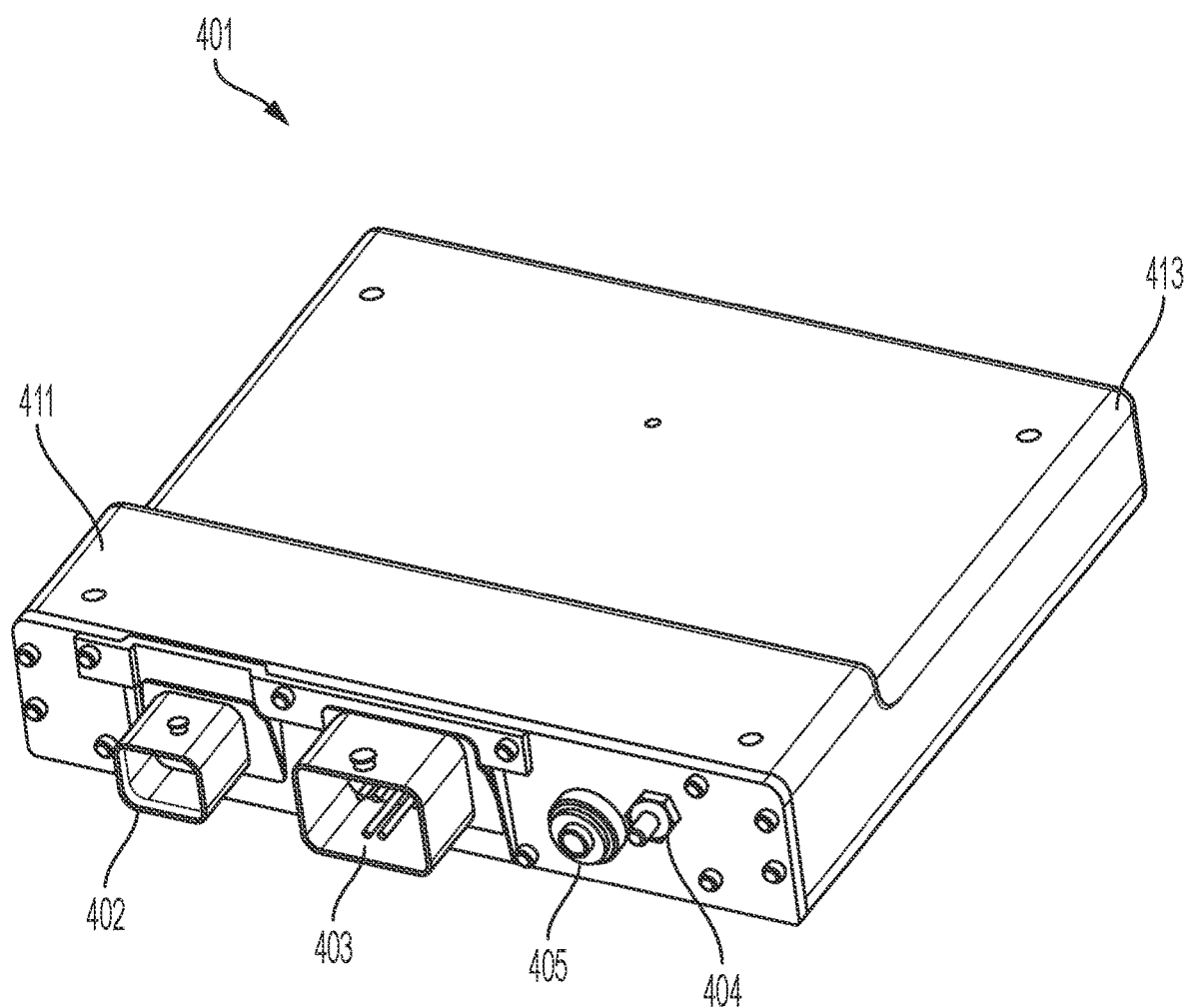
FIG. 4 illustrates an example housing and communication ports for a time master and data collection module.

The module may contain any all components in a single housing 401, with a form factor such as that shown below in FIG. 4 by way of example only. The housing will include one or more communication ports 402, 403, 404 that serve as connectors for sharing data with or from external sensors or other robotic device subsystems. Examples include Ethernet ports, GPIOs and other connectors. The housing also may include a wireless communication port 405 such as a connector for an external antenna, or an integrated antenna. The housing also may include one or more guiding structures that are positioned and configured to connect to one or more components of the vehicle or other robotic system. Examples include a ledge 411 that serves to stop the housing from moving into a smaller area, or one or more side rails 413 that are configured to interconnect with one or more receiving structures of the robotic system.

Figure 5:
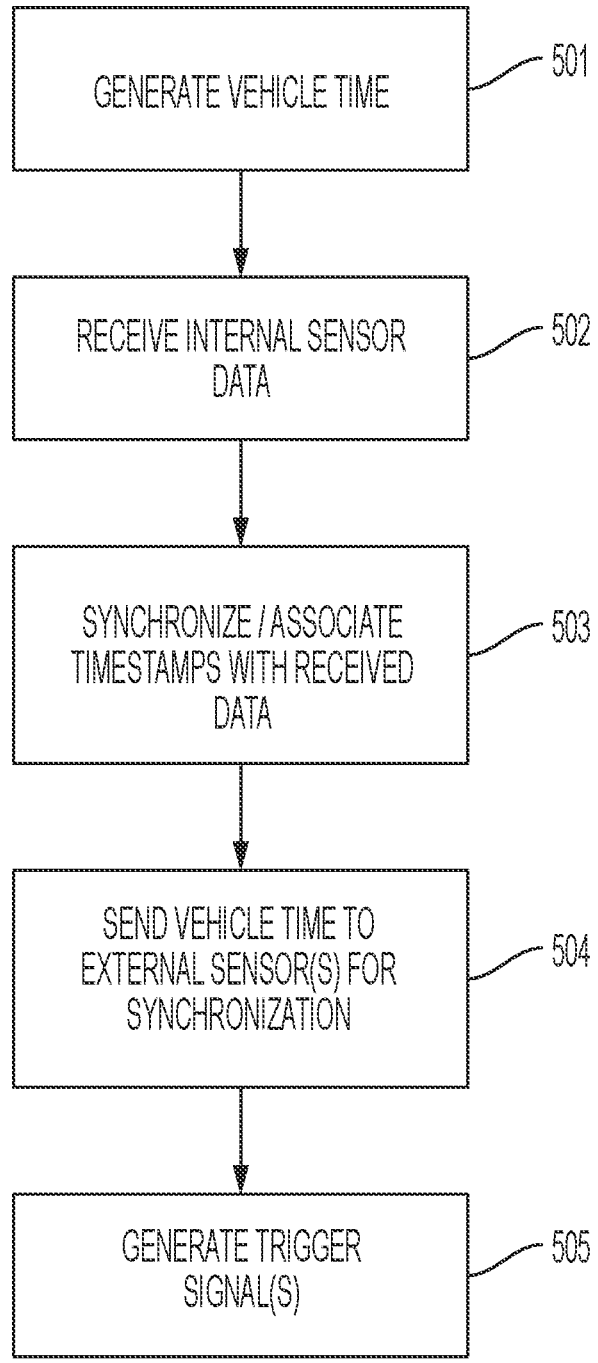
FIG. 5 is a flow diagram illustrating example processes that a time master and sensor data collection module may implement.

FIG. 5 is a flow diagram illustrating various actions that a time master and sensor data collection module may implement. The module's processor will operate as a timer that generates a vehicle time (step 501). The module may do this by way of, for example, receiving a time-varying periodic electrical signal from an oscillator that is a component of the module and using the signal to generate the vehicle time. The module will identify an epoch event (such as powering on the robotic device, moving the vehicle from a position of rest, or another designated epoch event), determine a start time upon occurrence of the epoch event (such as by determining the Global Time of the epoch event, or by designating the epoch event as time=zero, receiving the time-varying periodic electrical signal from the oscillator, and using the periodic electrical signal to drive the module's timer, with time being incremented from the zero time of the epoch event.

The processor will receive data from the one or more internal sensors contained within a housing that also contains the processor (step 502). The processor will synchronize the data from the internal sensors with the vehicle time by associating timestamps for the vehicle time with data generated by the internal sensors (step 503). For example, the internal sensor may be an IMU, and the module may synchronize the data from the IMU by associating timestamps for the vehicle time with data generated by the IMU. As another example, the sensors may include a GPS sensor, and the module may synchronize the data from the GPS by associating timestamps for the vehicle time with data generated by the GPS sensor. In the case of a GPS sensor, the synchronization may occur at the GPS sensor after the module passes vehicle time data to the GPS sensor.

The system also may facilitate synchronization of one or more external sensors with the time of other systems by sending the vehicle time to the external sensors for synchronization (step 504). For example, the module may cause a transmitter or communications port to send vehicle time data to an external LiDAR sensor.

Optionally, in some embodiments the module may serve to trigger actions by one or more external sensors (step 505). For example, the module may generate trigger signals for a camera according to the vehicle time, and it may cause a transmitter or communications port of the device to send the trigger signals to the camera.

Terminology that is relevant to this disclosure includes:

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

An "automated device" or "robotic device" refers to an electronic device that includes a processor, programming instructions, and one or more components that based on commands from the processor can perform at least some operations or tasks with minimal or no human intervention. For example, an automated device may perform one or more automatic functions or function sets. Examples of such operations, functions or tasks may include without, limitation, navigation, transportation, driving, delivering, loading, unloading, medical-related processes, construction-related processes, and/or the like. Example automated devices may include, without limitation, autonomous vehicles, drones and other autonomous robotic devices.

The terms "memory" and "memory device" each refer to a non-transitory device on which computer-readable data, programming instructions or both are stored. Except where specifically stated otherwise, the terms "memory" and "memory device" are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

The term "communicatively connected" refers to devices that are in electronic communication with each other via one or more wired or wireless communication services. A communication connector that may facilitate this may include a communication port; an antenna, receiver or transceiver; or other communication devices.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A time master and sensor data collection system for a robotic device, the system comprising:
    a housing;
    a processing device contained in the housing; and
    one or more sensors contained within the housing and communicatively connected to the processing device, the one or more sensors comprising at least an inertial measurement unit (IMU) and a global positioning system (GPS) sensor; and
    programming instructions that are configured to cause the processing device to:
        operate as a timer that generates a vehicle time without reliance on one or more other time systems,
        receive data from the one or more sensors contained within the housing, and
        synchronize the data from the one or more sensors contained within the housing with the vehicle time by associating timestamps for the vehicle time with data received from the one or more sensors.

2. The system of claim 1, wherein:
    the programming instructions that are configured to cause the processing device to synchronize the data from the one or more sensors contained within the housing with the vehicle time by associating timestamps for the vehicle time with data received from the one or more sensors comprise instructions to associate timestamps for the vehicle time with data generated by the IMU.

3. The system of claim 1, further comprising additional programming instructions that are configured to cause the processing device to:
    generate trigger signals for a camera according to the vehicle time, and
    cause a transmitter or communications port to send the trigger signals to the camera.

4. The system of claim 1, further comprising additional programming instructions that are configured to cause the processing device to synchronize data from an external LIDAR sensor to the vehicle time.

5. The system of claim 1, wherein the housing comprises one or more guiding structures that are positioned and configured to connect to one or more components of the robotic system.

6. The system of claim 1, wherein the vehicle time is a time for components contained within the housing and components of the robotic device that are not contained within the housing.

7. The system of claim 1, wherein:
    the programming instructions that are configured to cause the processing device to synchronize the data from the one or more sensors by associating timestamps for the vehicle time with data received from the one or more sensors comprise instructions to associate timestamps for the vehicle time to data generated by the GPS sensor.

8. The system of claim 7, wherein the programming instructions to synchronize the data from the one or more sensors comprise instructions to pass vehicle time data to the GPS sensor.

9. The system of claim 1:
    further comprising an oscillator that is:
        contained within the housing,
        configured to generate a time-varying periodic electrical signal upon identification of an epoch time, and
        communicatively connected to the processing device to pass the time-varying periodic electrical signal to the processing device;
    wherein the programming instructions to generate the vehicle time comprise programming instructions to use the time-varying periodic electrical signal to generate the vehicle time.

10. The system of claim 9, wherein the programming instructions to generate the vehicle time comprise instructions to:
    identify the epoch event that corresponds to a start time for the robotic device;

receive the time-varying periodic electrical signal from the oscillator;
use the periodic electrical signal to drive the timer until the robotic device is turned off; and
reset and restart the time when the epoch event next occurs.

11. The system of claim 1, further comprising additional programming instructions configured to cause a transmitter or communications port to send vehicle time data to an external LiDAR sensor.

12. The system of claim 11, further comprising a power supply that is electronically connected to provide power to the LiDAR sensor via a power output port.

13. The system of claim 12, further comprising a power conditioner electrically positioned between the power supply and the power output port to provide protection against surges and spikes in power transferred to the LiDAR sensor.

14. A time master and sensor data collection method for a robotic device, the method comprising:
by a data collection module of a robotic device having a processor and one or more sensors that comprise an inertial measurement unit (IMU) and a global positioning system (GPS) sensor:
generating a vehicle time without reliance on one or more other time systems,
receiving data from one or more sensors contained within a housing of the robotic device, and
synchronizing the data from the one or more sensors contained within the housing with the vehicle time by associating timestamps for the vehicle time with the data received from the one or more sensors.

15. The method of claim 14, wherein synchronizing the data also comprises passing vehicle time data to the GPS sensor.

16. The method of claim 14, further comprising, by the data collection module:
generating trigger signals for a camera according to the vehicle time, and
cause a transmitter or communications port to send the trigger signals to the camera.

17. The method of claim 14, further comprising, by the data collection module, synchronizing data from an external LIDAR sensor to the vehicle time.

18. The method of claim 14, further comprising, by the data collection module, causing a transmitter or communications port of the data collection module to send vehicle time data to an external LiDAR sensor.

19. The method of claim 14, wherein:
the data collection module further comprises an oscillator that is configured to generate a time-varying periodic electrical signal; and
the data collection module uses the time-varying periodic electrical signal to generate the vehicle time.

20. The method of claim 14, wherein generating the vehicle time comprises:
identifying an epoch event;
determining a start time for a timer that generates the vehicle time upon occurrence of the epoch event;
receiving the time-varying periodic electrical signal from the oscillator; and
using the periodic electrical signal to drive the timer, wherein:
the instructions to determine the start time upon occurrence of the epoch event comprise instructions to determine the start time upon the robotic device being turned on, and
the instructions further comprise instructions to stop the timer upon the robotic device being turned off.

* * * * *